United States Patent [19]
Petolino, Jr.

[11] Patent Number: 5,918,034
[45] Date of Patent: *Jun. 29, 1999

[54] METHOD FOR DECOUPLING PIPELINE STAGES

[75] Inventor: Joseph Anthony Petolino, Jr., Palo Alto, Calif.

[73] Assignee: Sun Microsystems, Inc., Mountain View, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/884,273

[22] Filed: Jun. 27, 1997

[51] Int. Cl.⁶ .............................. G06F 9/38; G06F 9/312; G06F 9/315

[52] U.S. Cl. .................. 395/394; 395/392; 395/391; 395/390; 395/381; 395/386; 395/393

[58] Field of Search ................................ 395/390, 392, 395/391, 386, 381, 393

[56] References Cited

U.S. PATENT DOCUMENTS

| | | |
|---|---|---|
| 3,771,138 | 11/1973 | Celtruda et al. . |
| 4,635,194 | 1/1987 | Burger et al. . |
| 5,586,277 | 12/1996 | Brown et al. ............................ 395/386 |
| 5,613,080 | 3/1997 | Ray et al. . |
| 5,640,588 | 6/1997 | Vegesna et al. ........................ 395/392 |
| 5,699,537 | 12/1997 | Sharangpani et al. .................. 395/393 |

*Primary Examiner*—Parshotam S. Lall
*Assistant Examiner*—William D. Thomson
*Attorney, Agent, or Firm*—Townsend and Townsend and Crew LLP

[57] ABSTRACT

The present invention solves the problems associated with the prior art by decoupling the issuing of instructions from their dispatch into their respective pipeline. This permits the determination of whether a particular instruction can safely be issued from an instruction queue to the next stage of the pipeline by providing such information at a point early in the machine cycle. In a multistage pipeline, a first stage is bypassed to provide instructions to a second stage regardless of the ability of the first stage to store the instruction from the instruction issuing unit.

13 Claims, 4 Drawing Sheets

METHOD FOR DECOUPLING PIPELINE STAGES

BACKGROUND OF THE INVENTION

The present invention relates to a method and apparatus for executing instructions in a computer. More specifically, the present invention relates to a method and apparatus for decoupling instruction steering operations from instruction dispatch operations in a pipelined microarchitecture.

Pipelining is an implementation technique whereby multiple instructions are overlapped in execution. A pipeline (also known as a functional unit) completes each instruction in a series of steps called pipeline stages. Instructions "enter" at one end of the pipeline, are processed through the stages, and "exit" at the other end (i.e., their intended effects are carried out).

The throughput of the pipeline is determined by how often instructions are completed. The time required to move an instruction one step down the pipeline is known as a machine cycle. The length of a machine cycle is determined by the time required by the slowest pipeline stage because all the stages must proceed at the same time. In this type of architecture, as in most, the chief means of increasing throughput is reducing the duration of the clock cycle. However, an alternative to increasing the clock frequency is to employ more than one pipeline. In systems employing multiple pipelines, instructions are dispatched by a scheduler, instruction steering and dispatch logic, or similar hardware construct. Instructions may be dispatched to the pipelines based on numerous factors, such as pipeline availability, op-code type, operand availability, data dependencies, and other considerations.

FIG. 1 is a flow chart which illustrates an exemplary set of pipeline stages according to the prior art. Not all instructions perform operations during each of these stages, but it is expected that each instruction will go through each of these stages, for reasons of coherency. The execution of an instruction begins at step 5 with the generation of an address (also known as the A stage). Next, at step 10, this address is presented to a memory unit such as an instruction cache during the instruction fetch (or F) stage. Once fetched, the instruction might then proceed to an instruction issue queue. At step 20, the instruction issues from the instruction issue queue during the instruction issue (or I) stage. In a microarchitecture using multiple pipelines, the proper functional unit may also be selected by an instruction steering unit at this time.

At step 30, operands are read from the register files or other locations during the read operand stage (or R stage). The instruction may be dispatched in the functional unit selected by instruction steering logic, although the instruction may also be held for a number of machine cycles. At this point, the register and functional unit dependencies are determined for the instructions in the present group of instructions with respect to those instructions and instructions in the functional unit(s). This determination is made concurrently with the register file access. If a dependency is found, or other reason exists to stall the instruction, the instruction in question is held until the dependency or other restriction is resolved. Thus, among its other functions, the R stage acts to hold one or more instructions until such time as the instruction(s) can safely be executed.

Once the necessary operands have been read, the instruction is executed during the execution (or E) stage (step 40). Actions taken during the E stage include the computation of results, including most arithmetic, shift, and the logical operations. Virtual addresses are also often computed during this stage, allowing data accesses to begin. Next is the cache read stage (C stage), during which certain integer results are written to temporary registers and certain load instructions have their results delivered (step 50), among other operations.

At step 60, cache misses are detected during the cache miss stage (M stage). This may be done, for example, by comparing the results from a translation lookaside buffer to the physical address contained in cache tag random-access memory (RAM), in addition to other operations. During the write data stage (W stage), data may be written to temporary storage areas (step 70). Exceptional conditions requiring the cancellation and re-issue (e.g., recirculation) of one or more instructions may also be signaled during this stage. An instruction is recirculated by re-introducing the instruction (and, possibly, other instructions) into the instruction queue. Conditions leading to recirculations include data cache misses, TLB misses, incorrect predictions, and other such conditions. Integer traps, as well as other exceptions, are signaled at step 80 during the trap determination stage (T stage). At the data write stage (D stage), data is written to a register file (step 90).

In a pipeline of the prior art, such as that described, the instruction steering logic must examine the state of the functional units during every machine cycle, including examining instructions held in the R stage and instructions released in the E stage for execution. The instruction steering and dispatch logic must decide which of the waiting instructions can safely proceed into their assigned functional unit at the end of the machine cycle (i.e., which instructions may vacate the R stage). This is a complex decision, and the logic dedicated to making this decision often contains some of a microarchitecture's most critical paths. At the same time, the instruction steering and dispatch logic must examine the instructions about to issue, allocate functional units for their execution, and then transfer as many of those instructions as possible from the instruction queue to their target functional units.

Because instructions are removed from the instruction queue in order (for an in-order pipelined architecture), an instruction cannot be removed from the instruction queue unless all of the preceding instructions will also be removed by that time. An instruction cannot be transferred from the instruction queue to the R stage of its assigned functional unit unless that functional unit is either unoccupied in the present machine cycle or contains an instruction that will vacate the R stage at this time.

Thus, a tension exists. The instruction queue needs to know as early in the machine cycle as possible whether or not an instruction in a particular R stage will vacate because of the time consumed in grouping instructions and determining where the instruction should be sent. Unfortunately, the decision to vacate a functional unit's R stage by the end of the present machine cycle may not be made until late in that cycle for several reasons. Certain data dependencies may only be resolved late in the machine cycle. The instruction queue and instruction steering logic are thus not able to depend on receiving vacate information early enough to permit these units to safely issue and steer the instructions waiting to be issued.

If a pipelined microarchitecture is to be capable of dispatching one instruction per cycle into each functional unit, this limitation must be addressed. One way to address this limitation is to increase the duration of the machine cycle (i.e., slow the pipeline) sufficiently to allow the determination to be made. However, this has the untenable side-effect of reducing throughput. What is therefore required is a method and apparatus which permits the determination of whether a particular instruction can safely be issued from an instruction queue to the next stage of the pipeline at a point early in the machine cycle, while maintaining the pipeline's throughput at an acceptable level.

SUMMARY OF THE INVENTION

The present invention solves the problems associated with the prior art by decoupling the issuing of instructions from their dispatch into their respective pipeline. This permits the determination of whether a particular instruction can safely be issued from an instruction queue to the next stage of the pipeline by providing such information at a point early in the machine cycle.

The present invention provides a pipeline stage, referred to herein as the staging stage (S stage), between the I stage and the R stage of a pipeline such as that in FIG. 1. The S stage serves to decouple the issuance of instructions stored in the I stage from the dispatching of instructions stored in the R stage. Because the S stage may be bypassed, a critical control path in the pipeline is eliminated. In a microarchitecture of the present invention, an instruction can be issued prior to the determination of whether the instruction in the R stage will actually be dispatched.

The issuing of instructions is speeded by reducing the time needed to determine the state (occupied or unoccupied) of the stage to which the instruction will issue. The S stage reacts quickly because little logic is involved in determining whether or not the S stage is occupied, and so the decision as to whether to issue an instruction can be made early in the machine cycle. This is in contrast to the R stage, which requires a relatively long time to determine whether or not an instruction will be dispatched. If the instruction issue queue were to issue instructions only to the R stage, the instruction issue queue would be forced to wait until late in the machine cycle to decide whether or not to issue an instruction. In some cases, this would be too late to actually issue an instruction, and the issue queue would have to stall.

In a given machine cycle, if there is an instruction in the I stage which can be issued to a given functional unit, that instruction may be removed from the I stage (instruction issue queue) unless both the R and S stages of the selected functional unit are occupied, in which case the instruction must wait in the instruction queue (or, in some architectures, be dispatched to another functional unit). However, if the R stage instruction register was empty (or, in some architectures, it can be determined quickly enough that the R stage will be vacated) during that same machine cycle, the newly-issued instruction is latched into the R stage; otherwise, the newly-issued instruction is latched into the S stage, from which it will be transferred to the R stage when the R stage becomes vacant. The S stage thus allows an instruction to be issued from the I stage without knowing whether a prior instruction will leave the R stage, so long as the S stage is unoccupied (a fact which is known early in the machine cycle). Because the decision to vacate the R stage is made very late in the cycle, it would otherwise be infeasible for the I stage issue logic to depend on such information. Because the I stage can issue an instruction based solely on the state of the S stage (known early in the machine cycle), the I stage will not stall unless the selected functional unit is stalled in the R stage and has its S stage occupied.

According to one aspect of the present invention, a processor is provided which avoids the problems of the prior art. The processor includes an instruction issue unit, which is configured to store instructions. A functional unit is also provided, and includes one or more stages (including an R stage). The functional unit is capable of executing the aforementioned instructions. The instruction issue unit is coupled to one of the functional unit's R stage and issues one (or more, depending on the architecture) of the instructions to the one of the functional unit's stages. The processor also includes a staging (or S) stage, which is coupled to the instruction issue unit and to the R stage. If the R stage is unable to store the instruction and the S stage is able to store the instruction, the S stage stores the issued instruction. If the R stage is able to store the issued instruction, that is done. Otherwise, the instruction must wait (or, in some architectures, be executed in another functional unit).

A further understanding of the nature and advantages of the present invention may be realized by reference to the remaining portions of the specification and the drawings.

DETAILED DESCRIPTION

An Exemplary Microarchitecture of the Present Invention

Figure 2:
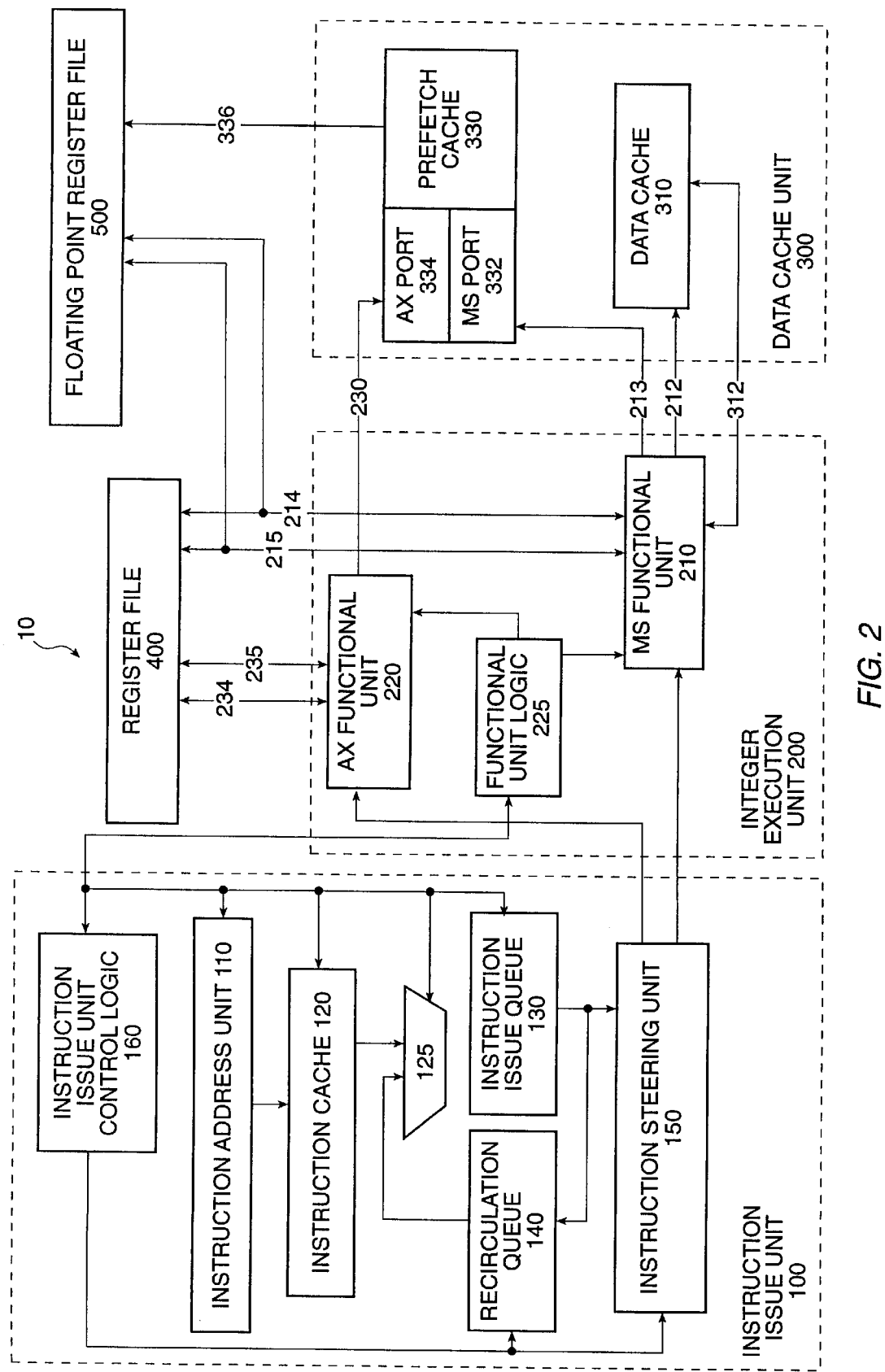
FIG. 2 is a block diagram showing a microarchitecture including architectural constructs according to the present invention.

FIG. 2 illustrates an exemplary microarchitecture 10 according to the present invention, which includes an instruction issue unit 100, an integer execution unit 200, a data cache unit 300, a register file 400, and a floating point register file 500. However, only a subset of the possible structures and data paths microarchitecture 10 might contain are shown in FIG. 2. A fully functional microarchitecture would likely contain additional functional units, sequencing logic, data paths, glue logic, and similar architectural constructs. For example, instruction issue unit 100 might contain multiple instruction caches; a floating point unit might be included, as might a graphics unit. The partial microarchitecture shown in FIG. 2 is only for illustrative purposes and is intended only to provide one possible framework in which the method and an apparatus of the present invention might be practiced.

Instructions are retrieved in instruction issue unit 100 when an instruction address unit 110 provides an address to an instruction cache 120. Instruction cache 120 then provides the instructions to a multiplexer 125, which in turn provides them to an instruction issue queue 130. Alternatively, multiplexer 125 may select one or more instructions from a recirculation queue 140 to be provided to instruction issue queue 130. Instruction issue queue 130 subsequently provides the instructions to an instruction steering unit 150. These elements are controlled by instruction issue unit control logic 160.

Integer execution unit 200 includes two functional units (i.e., pipelines) and their associated circuitry. The first of these is a memory/special (MS) functional unit 210, which accesses data cache unit 300 by sending addresses to data cache unit 300 over MS DCache address lines 212 and MS PCache address lines 213. MS functional unit 210 reads data from and writes data to register file 400 and floating point register file 500 via MS data lines 214, selecting locations to read from and write to using MS control lines 215. An AX functional unit 220 is also illustrated as an element of integer execution unit 200. AX functional unit 220 accesses data cache unit 300 by sending addresses to data cache unit 300 over AX address lines 230. AX functional unit 220 reads data from and writes data to register file 400 via AX data lines 234, selecting locations to read from and write to using AX control lines 235. Finally, functional unit logic 225 is provided to control certain operations within MS functional unit 210 and AX functional unit 220, such as instruction dispatch from the R stage.

Data cache unit 300 is shown as including two data caches. A data cache (DCache) 310 is provided to cache data on an as-needed basis. DCache 310 receives MS DCache address lines 212 from MS functional unit 210, and communicates data to and from MS functional unit 210 via DCache data lines 312.

A prefetch cache (PCache) 330 is also provided as part of data cache unit 300. PCache 330 is accessed in the same manner as other caches, but differs in the way data is loaded into the cache. In addition to supporting cache fills in the manner of DCache 310, data may be loaded into PCache 330 (pre-fetched) under either hardware or software control, whether or not the data is needed immediately.

PCache 330 also differs from DCache 310 in that PCache 330 supports accesses by both MS functional unit 210 and AX functional unit 220. MS functional unit 210 accesses an MS port 332 of PCache 330 via MS PCache address lines 213. MS functional unit 210 accesses both caches by presenting the data address to each cache simultaneously. AX functional unit 220 communicates with PCache 330 via AX addresses lines 230, which are coupled to an AX port 334. PCache 330 communicates data to floating point register file 500 via PCache data lines 336.

In operation, microarchitecture 10 is capable of executing many different kinds of instructions (i.e., its instruction set). During the execution of any instruction set, an initial step is to fetch the instruction to be executed from the location in which it is stored. In microarchitecture 10, this step is performed by the generation of an instruction address by instruction address unit 110. The instruction's address is communicated to instruction cache 120 which supplies the addressed instruction to a multiplexer 125. This assumes that the instruction to be executed resides in instruction cache 120. If such is not the case, the required instruction may be fetched from external memory (not shown) such as a second-level cache or main memory.

The instruction to be executed is then passed through multiplexer 125 to instruction issue queue 130. Instruction issue queue 130 may be of any appropriate depth, but the queue's depth will likely be based on the number of stages in the functional units (i.e., pipelines) prior to the pipeline stage at which instructions are dispatched. Instruction issue queue 130 issues the instruction to be executed to both instruction steering unit 150 and recirculation queue 140.

Recirculation queue 140 serves to temporarily store the fetched instructions and maintains their order to provide for the case where an instruction must be canceled from the pipeline to which it is dispatched. In microarchitecture 10, not only is the given instruction canceled, but instructions younger than the canceled instruction may be canceled as well. Instruction issue unit control logic 160 detects the conditions giving rise to the need for instruction recirculation. The canceled instructions must then be re-issued and re-dispatched. This is done by transferring the proper instruction(s) from recirculation queue 140 to instruction issue queue 130 via multiplexer 125.

The instructions issued to instruction steering unit 150 are then issued to one of the functional units. Instruction steering unit 150 evaluates the resource requirements of the instructions available for issue, in conjunction with the currently-available functional unit resources, allocates those resources, and steers the instructions to the staging areas of the corresponding functional units for subsequent execution. The selection of acceptable functional units for each instruction is determined during the design of the instruction set and microarchitecture, and is based on the resources required by the given instruction (e.g., access to a translation lookaside buffer (TLB), access to DCache 310, access to other functional units, and similar criteria).

In performing the steering function, instruction steering unit 150 also groups instructions together because each functional unit in microarchitecture 10 is capable of executing only one instruction in any given time slice (although this need not be the case). Thus, instructions grouped together will be executed in a single time slice. A fundamental precept for grouping instructions, then, is that no two instructions in a group may require the use of the same functional unit (a physical impossibility in microarchitecture 10). The analysis performed in grouping instructions is complex and time consuming, and is a primary reason that the availability of a given functional unit must be determined early in the machine cycle.

Instruction steering unit 150 thus steers instructions to the functional units of microarchitecture 10 such that as many functional units as possible are utilized in any one time slice. Thus, the determination of instruction groups is an important one for reasons of efficiency. In microarchitecture 10, the maximum number of instructions in a group is two, because there are only two functional units and each can execute no more than one instruction in a given time slice. With more functional units, greater parallelism could be achieved. For purposes of this discussion, however, the instruction to be executed will be assumed to be executed in one of the functional units shown as part of integer execution unit 200.

Figure 1:
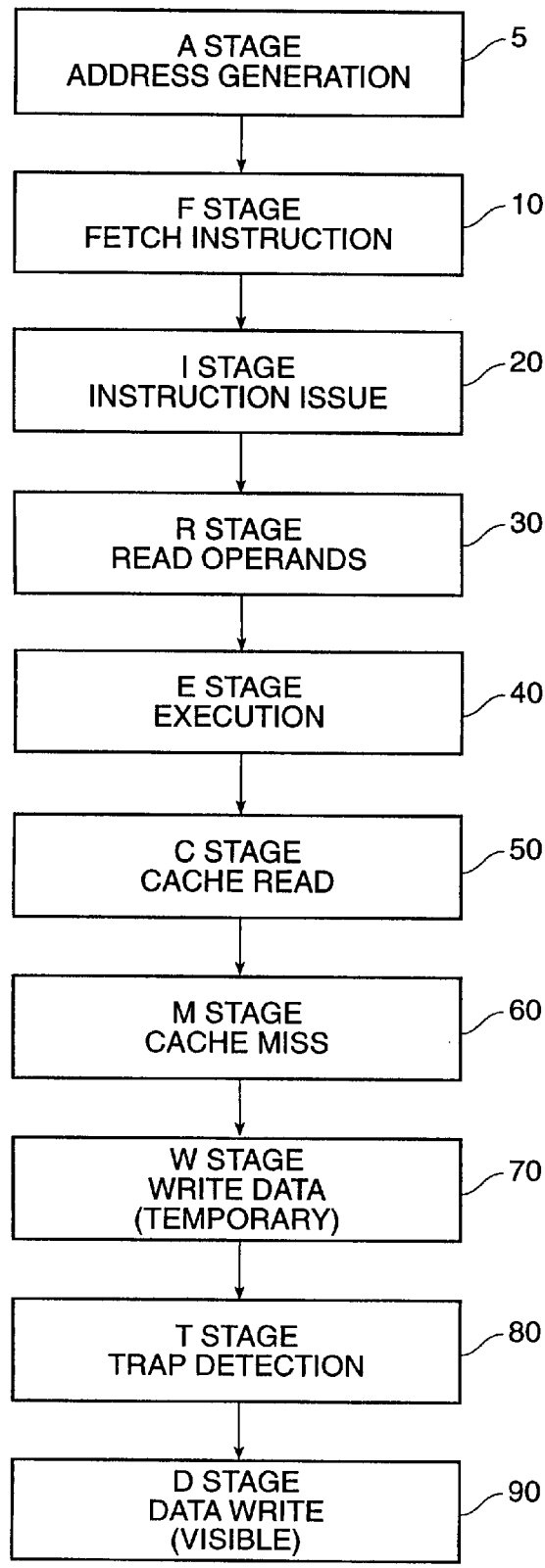
FIG. 1 is a flow diagram showing the stages in an exemplary pipeline of the prior art.

The functional units of microarchitecture 10 embody those stages illustrated in FIG. 1. However, these functional units also include an extra stage, which is situated between the I stage and R stage of FIG. 1. This stage, known as a staging (or S) stage, decouples instruction dequeueing in the I stage (instruction issue by instruction issue queue 130 and instruction steering unit 150) from the dispatching of instruction in the R stage of the functional units. The inclusion of an S stage allows the decision as to whether an instruction should be issued to a functional unit to be made early in a given machine cycle, without regard to whether the instruction currently in the R stage will vacate by the end of that machine cycle. The S stage does this by providing a temporary storage location for instructions in the event that the R stage register(s) are not vacated by the end of the machine cycle.

Figure 3:
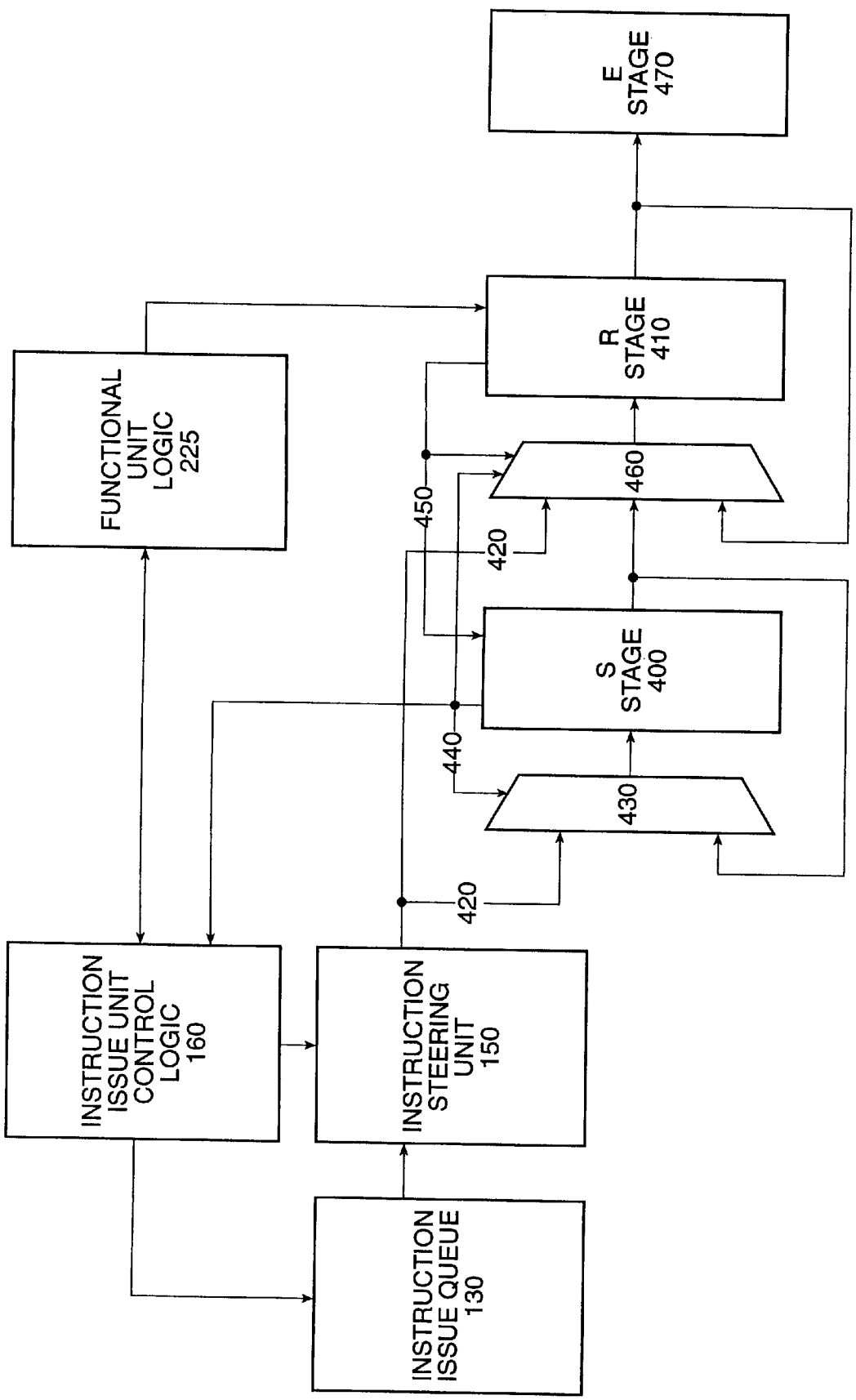
FIG. 3 shows a block diagram of a pipeline section which includes a decoupling stage according to the present invention.

FIG. 3 illustrates a block diagram of a portion of microarchitecture 10. The functional unit stages shown can belong to either MS functional unit 210 or AX functional unit 220. Instruction issue queue 130 issues instructions through instruction steering unit 150 to S stage 400 and R stage 410 over an instruction bus 420. S stage 400 may be viewed either as a single-entry FIFO, or, equivalently, as a pipeline stage with a bypass around it. A multiplexer 430 selects between instruction bus 420 and an output of S stage 400, based on an S stage occupied signal 440. S stage occupied signal 440 is also provided to instruction issue unit control logic 160 and indicates to instruction issue unit control logic 160 whether or not S stage 400 is occupied. The contents of S stage 400 are transferred to R stage 410 when R stage 410 becomes unoccupied. Functional unit logic 225 actually controls the dispatch of an instruction in R stage 410.

Implicitly, then, if S stage 400 is still occupied at the beginning of the next machine cycle (or, for that matter, at the beginning of any machine cycle), the instruction held in R stage 410 must not have vacated at the end of the previous machine cycle. Thus, S stage occupied signal 440 indicates when both S stage 400 and R stage 410 are occupied, making it unnecessary for R stage 410 to indicate this to instruction issue unit control logic 160. Moreover, if S stage occupied signal 440 indicates that one or both of these stages is unoccupied, then S stage 400 must be unoccupied because S stage 400 is always emptied first. Thus, one implementation of the present invention might always issue the instruction to S stage 400 when S stage occupied signal 440 indicated that one of the stages was free. Alternatively, R stage occupied signal 450 could be examined in such situations, prior to issuing the instruction.

In controlling multiplexer 430, S stage occupied signal 440 also determines if the instruction currently in S stage 400 (if any) is stalled (i.e., held in S stage 400). This occurs in response to the older instruction held by R stage 410 being held, as indicated by an R stage occupied signal 450. For example, an instruction might be held as a result of a data dependency, as noted previously. R stage occupied signal 450 is provided to S stage 400 to allow S stage 400 to determine whether its contents should be transferred to R stage 410 during the next machine cycle or held in S stage 400. If S stage 400 is to transfer its contents to R stage 410, the functional unit's contents all shift down one stage, beginning execution of the instruction that was in R stage 410. An instruction is then issued into S stage 400 on the next machine cycle (microarchitecture 10 will not issue an instruction to an S stage if the S stage indicates it is occupied at the beginning of a given machine cycle).

However, the functional unit in question may have been idle for one or more cycles due to resource hazards or for similar reasons. Assuming no stalls have occurred in the functional unit, not only is S stage 400 unoccupied, but R stage 410 is unoccupied as well. In that case, it is preferable to allow an instruction to issue directly into R stage 410. A multiplexer 460 therefore selects instruction bus 420 as input to R stage 410, under the control of S stage occupied signal 440 and R stage occupied signal 450.

These two signals actually cause multiplexer 460 to select one of instruction bus 420, the output of S stage 400, or the output of R stage 410 as an input to R stage 410. The selection is made according to the following rules. If both stages are unoccupied, instruction bus 420 is selected, transferring the instruction to R stage 410 directly. If S stage 400 is occupied, but R stage 410 is vacated, the output of S stage 400 is selected, and the instruction continues down the pipeline. If R stage 410 is to hold its present instruction, the output of R stage 410 is selected. R stage 410 determines whether an instruction is to be held based on control signals from functional unit logic 225 (and possibly others (not shown)). Once released for execution, the instruction proceeds to E stage 470.

Figure 4:
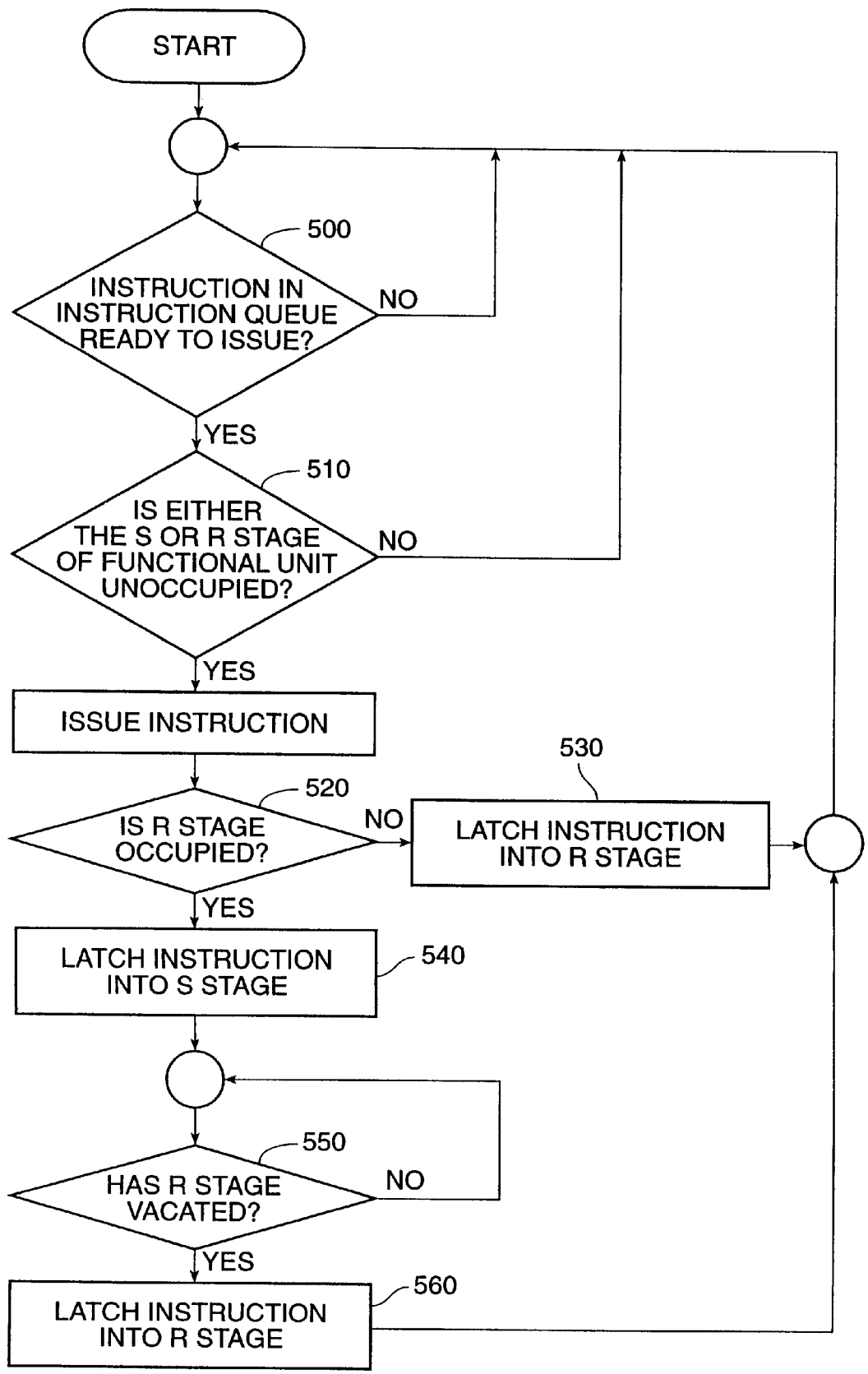
FIG. 4 shows a flow diagram of the operation of a decoupling stage according to the present invention.

FIG. 4 is a flow diagram illustrating this paradigm. The method of the present invention is not concerned with the execution of any particular instruction, but rather, presents the criteria by which decisions are made as to the proper holding and dispatch of instructions to be executed. The method of the present invention is described using the elements of microarchitecture 10. Elements from previous figures are referred to by the reference numbers used in their description.

Decoupling of instruction issue from instruction dispatch, according to the present invention, begins by determining if an instruction is ready to issue from instruction issue queue 130 (step 500). Assuming that one or more instructions are waiting to be executed, S stage 400 and R stage 410 (of the functional unit that will be selected by instruction steering unit 150 to receive the instruction to be issued) are examined to determined if either is able to store an instruction (i.e., if either is unoccupied). This amounts to examining S stage occupied signal 440, which indicates whether S stage 400 (and, by implication, R stage 410) is occupied. If both are unable to store the instruction, instruction issue queue 130 does not issue the instruction to the selected functional unit, and waits until it may do so.

R stage 410 would be unable to store the instruction in at least two situations. First, the instruction may simply be stalled in R stage 410, waiting for a dependency to be resolved or resources to become available, for example. Alternatively, R stage 410 may not be able to indicate to S stage 400 (and so to the associated elements of instruction issue unit 100) that the instruction currently stored in R stage 410 will indeed vacate by the end of the current machine cycle, in time for those elements to consider such information (i.e., the ability of R stage 410 to store the new instruction is indicated too late in the machine cycle). Conversely, S stage 400 would be able to store the instruction if, for example, an instruction which was stored in S stage 400 moved to R stage 410 in the last machine cycle, or S stage 400 had been unoccupied for one or more machine cycles (for example, because no instructions had stalled in R stage 410 or no instructions had issued to the particular functional unit for some time).

Assuming one or both of S stage 400 or R stage 410 is able to store the instruction, the instruction is issued to the functional unit selected by instruction steering unit 150 at step 515. Next, R stage occupied signal 450 is examined to determine if the instruction may be latched into R stage 410. This amounts to simply issuing the instruction to the selected functional unit, because multiplexers 430 and 460 will route the instruction to the proper stage (S or R). In a preferred embodiment, if the R stage is unoccupied (as indicated by R stage occupied signal 450), the instruction may be routed to R stage 410 by multiplexer 460, where it is latched at step 530.

However, multiplexer 460 and R stage occupied signal 450 could be removed from the circuit of FIG. 3, forcing instruction steering unit 150 to issue instructions only to S stage 400 via instruction bus 420. In that case, instructions would always proceed through S stage 400 prior to being dispatched by R stage 410. Because S stage 400 would still be able to indicate its ability to store the instruction to be issued (via S stage occupied signal 440), the benefits of allowing instructions to issue without knowing the state of R stage 410 early in the machine cycle (occupied or unoccupied) is still provided.

If R stage occupied signal 450 indicates that R stage 410 is occupied, two actions are taken. First, the instruction is routed to S stage 400 by multiplexer 430, under the control of S stage occupied signal 440 at step 540. The instruction remains in S stage 400 until the instruction in R stage 410 vacates (i.e., begins execution in E stage 470). This is shown in FIG. 4 by step 550, where the process waits until R stage 410 is unoccupied. Second, R stage 410 places a hold on its current instruction. R stage occupied signal 450 indicates to multiplexer 460 that the instruction is to be held. In response, multiplexer 460 feeds the output of R stage 410 to its input. (In microarchitecture 10, registers within the functional units are clocked on every clock cycle, and so must have their output fed back into their input to retain their contents.) Alternatively, R stage may simply vacate too late in the machine cycle to be able to indicate that event.

Once R stage 410 is able to store the instruction, the instruction is transferred to R stage 410 (step 560) via multiplexer 460 under the control of S stage occupied signal 440 and R stage occupied signal 450, which select the output of S stage 400 as the input to R stage 410. Once the instruction is in R stage 410, it awaits execution. The instruction is held in R stage 410 until the proper resources are available and all dependencies have been resolved.

Table 1 provides an example of the operation of the method of the present invention. Table 1 shows an instruction sequence having an ADD (integer add) instruction, an LDI (load integer) instruction, and an STO (store integer) instruction. This example assumes that no forwarding of data is performed in the given microarchitecture.

TABLE 1

Exemplary instruction sequence

| Instr | Op 1 | Op 2 | Machine Cycle -> | 0 | 1 | 2 | 3 | 4 | 5 | 6 | 7 | 8 | 9 | 10 |
|---|---|---|---|---|---|---|---|---|---|---|---|---|---|---|
| ADD | R1 | R2 | Stage -> | I | R | E | C | M | W | T | D | — | | — |
| LDI | R2 | [R1] | Stage -> | — | I | R | R | E | C | M | W | T | D | — |
| STO | [R3] | R4 | Stage -> | — | — | I | S | R | E | C | M | W | T | D |

The instructions and their operands appear first in Table 1. Next, the machine cycle and the location of each instruction in the pipeline (its current stage) are shown. The LDI instruction loads data in the memory location pointed to by the contents of register 1 (R1) into R2. The use of R1's contents as a memory address is indicated by the brackets that surround R1 in Table 1. Similarly, the STO instruction stores data from R4 into the memory location pointed to by the contents of R3.

In Table 1, an LDI instruction is held in R stage 410 of MS functional unit 210 for one cycle, due to a dependency on the preceding ADD instruction. The STO instruction following the LDI instruction is steered into MS functional unit 210 in machine cycle 2 on the (false) assumption that the LDI instruction (which is in R stage 410 of MS functional unit 210 during that machine cycle) will not be held in R stage 410 at the end of cycle 2. Because R stage 410 is occupied with the LDI instruction during machine cycle 3, the STO instruction is stored in S stage 400 of MS functional unit 210 during that machine cycle.

Having fully described the preferred embodiments of the present invention, many other equivalent or alternative methods of implementing instruction issue decoupling according to the present invention will be apparent to those skilled in the art. For example, the method of the present invention is not limited to the microarchitecture illustrated in FIG. 2. Microarchitecture 10 is a load/store architecture, meaning that data must be loaded into a register in the register file prior to any operations being performed on it. However, other architectures may benefit from the present invention. For example, a register/memory architecture, in which data may be operated on while still in memory, could be designed to take advantage of the present invention. Also, many more functional units (e.g., floating point, graphics, and possibly others) would likely be included in microarchitecture 10. Finally, out-of-order execution might be provided for in microarchitecture 10. These equivalents and alternatives, and others, are intended to be included within the scope of the present invention.

What is claimed is:

1. A method for issuing one or more of a plurality of instructions stored in an instruction issue unit, the one or more of the plurality of instructions being executable by a functional unit having a plurality of stages, the instruction issue unit coupled to a first one and a second one of the plurality of stages, the first one of the plurality of stages being coupled to the second one of the plurality of stages, the first one and the second one of the plurality of stages being configured to store the one or more of the plurality of instructions, comprising the steps of:

determining if the one or more of the plurality of instructions are ready to issue from the instruction issue unit;

determining if the first one of the plurality of stages is able to store the one of more of the plurality of instructions;

issuing the instruction, if the one or more of the plurality of instructions is ready to issue from the instruction issue unit and the first one of the plurality of stages is able to store the one or more of the plurality of instructions; and if the one or more of the plurality of instructions issue, determining if the second one of the plurality of stages is able to store the one or more of the plurality of instructions, and, if the second one of the plurality of stages is able to store the one or more of the plurality of instructions, bypassing the first one of the plurality of stages by storing the one or more of the plurality of instructions directly in the second one of the plurality of stages, and, otherwise, storing the one or more of the plurality of instructions in the first one of the plurality of stages.

2. The method of claim 1 wherein said step of storing the one or more of the plurality of instructions in the first one of the plurality of stages further comprises the steps of:

waiting for the second one of the plurality of stages to become able to store the one or more of the plurality of instructions; and storing the one or more of the plurality of instructions in the second one of the plurality of stages.

3. The method of claim 1 wherein the one of more of the plurality of instructions is stored in the first one of the plurality of stages if the first one of the plurality of stages is able to store the one or more of the plurality of instructions, regardless of whether the second one of the plurality of stages is able to store the one of more of the plurality of instructions.

4. A method for issuing one or more of a plurality of instructions stored in an instruction issue unit, the one or more of the plurality of instructions being executable by a functional unit having a plurality of stages, the instruction issue unit coupled to a first one and a second one of the plurality of stages, the first one of the plurality of stages being coupled to the second one of the plurality of stages, the first one and the second one of the plurality of stages being configured to store the one or more-of the plurality of instructions, comprising the steps of:

determining if the one or more of the plurality of instructions are ready to issue from the instruction issue unit;

determining if the first one of the plurality of stages is able to store the one of more of the plurality of instructions;

if the one or more of the plurality of instructions is ready to issue from the instruction issue unit and the first one of the plurality of stages is able to store the one or more of the plurality of instructions
issuing the instruction to the functional unit, and storing the one or more of the plurality of instructions in the first one of the plurality of stages; and determining if the second one of the plurality of stages is able to store the one or more of the plurality of instructions, and, if the second one of the plurality of stages is able to store the one or more of the plurality of instructions, bypassing the first one of the plurality of stages by storing the one or more of the plurality of instructions directly in the second one of the plurality of stages.

5. The method of claim 4 wherein said step of storing the one or more of the plurality of instructions in the first one of the plurality of stages further comprises the steps of:

waiting for the second one of the plurality of stages to become able to store the one or more of the plurality of instructions; and storing the one or more of the plurality of instructions in the second one of the plurality of stages.

6. The method of claim 5 wherein the one of more of the plurality of instructions is stored in the first one of the plurality of stages, if the first one of the plurality of stages indicates to the instruction issue unit that the first one of the plurality of stages is able to store the one of more of the plurality of instructions within a period of time and the second one of the plurality of stages is unable to indicate to the instruction issue unit that the second one of the plurality of stages is able to store the one of more of the plurality of instructions within said period of time.

7. The method of claim 5 wherein the first one of the plurality of stages is unable to store the one of more of the plurality of instructions if a first one of the plurality of instructions is currently stored in the first one of the plurality of stages.

8. The method of claim 5 wherein the second one of the plurality of stages is unable to store the one of more of the plurality of instructions if a first one of the plurality of instructions is currently stored in the second one of the plurality of stages.

9. A method for issuing one or more of a plurality of instructions stored in an instruction issue unit, the one or more of the plurality of instructions being executable by a functional unit having a plurality of stages, the instruction issue unit coupled to a first one and a second one of the plurality of stages, the first one and the second one of the plurality of stages being configured to store the one or more of the plurality of instructions, comprising the steps of:

determining if the one or more of the plurality of instructions are ready to issue from the instruction issue unit during a machine cycle;

determining if the first one of the plurality of stages is able to store the one of more of the plurality of instructions during said machine cycle; and issuing the instruction, if the one or more of the plurality of instructions is ready to issue from the instruction issue unit during said machine cycle and the first one of the plurality of stages is able to store the one or more of the plurality of instructions during said machine cycle, and storing the one or more of the plurality of instructions in the second one of the plurality of stages, if the second one of the plurality of stages is able to indicate to the instruction issue unit that the one or more of the plurality of instructions can be stored therein, said indication being early enough in said machine cycle for the instruction issue unit to cause the one or more of the plurality of instructions to be issued to the second one of the plurality of stages and, storing the one or more of the plurality of instructions in the first one of the plurality of stages, otherwise.

10. The method of claim 9 wherein said step of storing the one or more of the plurality of instructions in the first one of the plurality of stages further comprises the steps of:

waiting for the second one of the plurality of stages to become able to store the one or more of the plurality of instructions; and storing the one or more of the plurality of instructions in the second one of the plurality of stages.

11. The method of claim 9 further comprising the step of storing the one or more of the plurality of instructions in the first one of the plurality of stages, regardless of whether the second one of the plurality of stages is able to store the one or more of the plurality of instructions.

12. The method of claim 9 wherein said step of determining if the first one of the plurality of stages is able to store the one of more of the plurality of instructions during said machine cycle is performed by examining a first occupied signal generated by the first one of the plurality of stages.

13. The method of claim 12 wherein said step of determining if the second one of the plurality of stages is able to store the one of more of the plurality of instructions during said machine cycle is performed by examining a second occupied signal generated by the second one of the plurality of stages.

* * * * *